Dec. 3, 1940.  E. A. STALKER  2,223,744
WING AND SIMILAR CONSTRUCTION
Original Filed Jan. 24, 1938   3 Sheets-Sheet 1
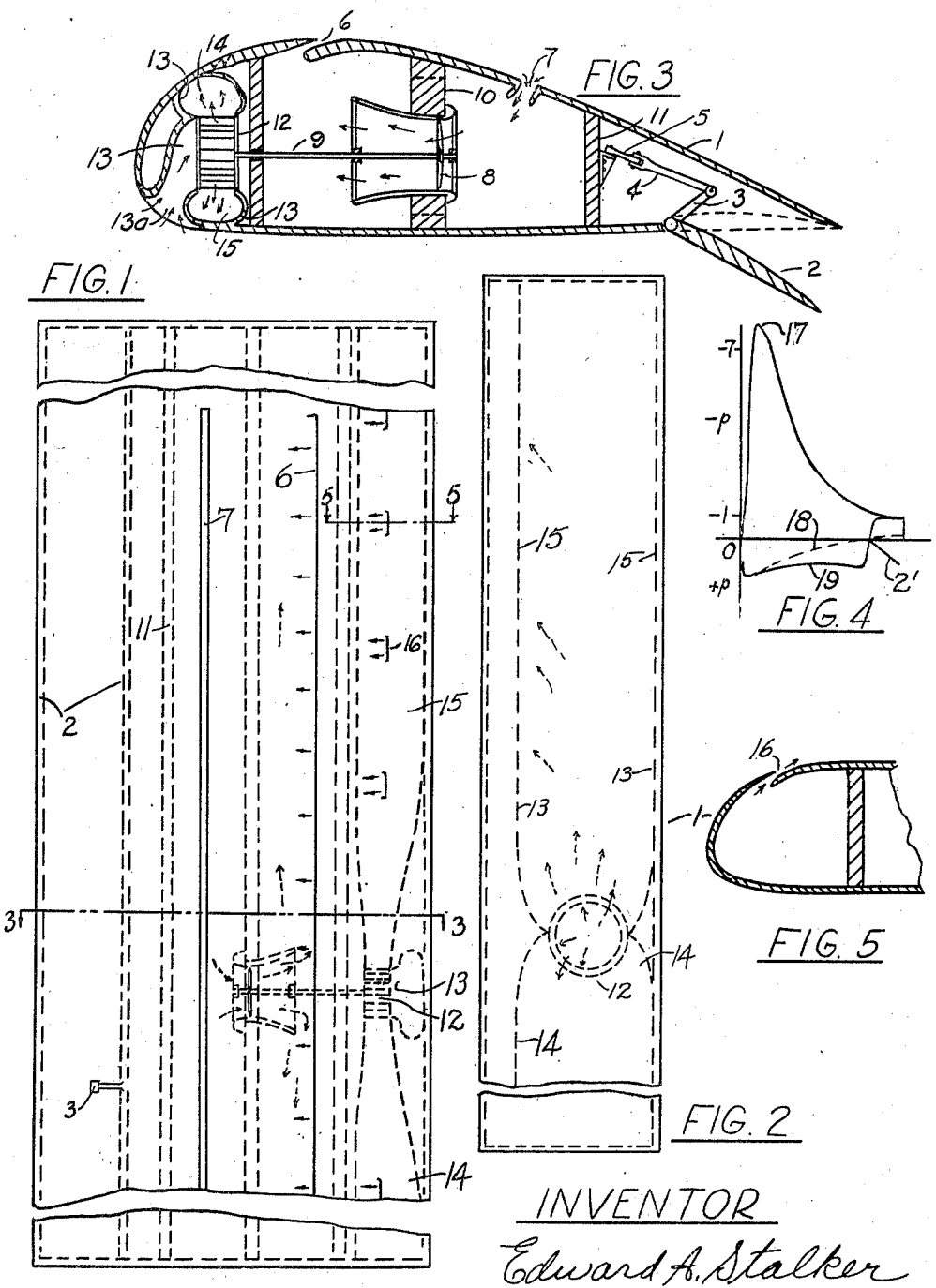
INVENTOR
Edward A. Stalker Dec. 3, 1940. E. A. STALKER 2,223,744
WING AND SIMILAR CONSTRUCTION
Original Filed Jan. 24, 1938   3 Sheets-Sheet 2
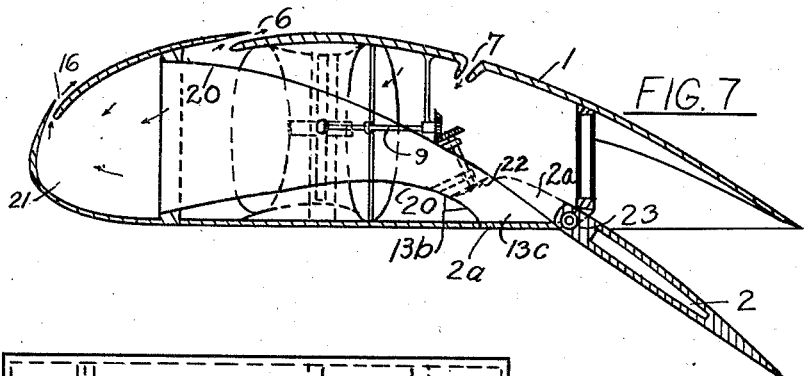
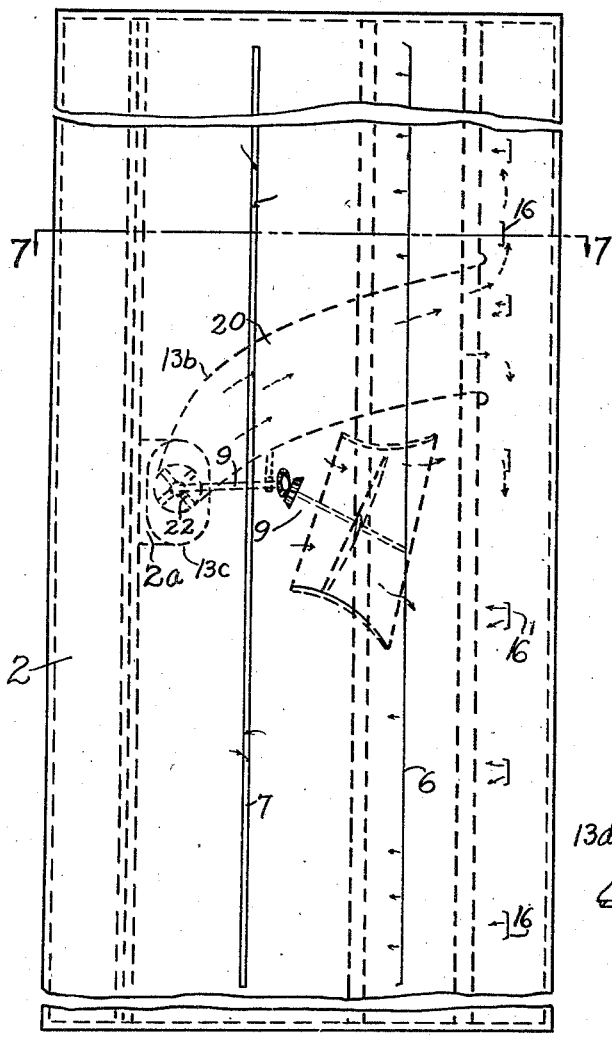
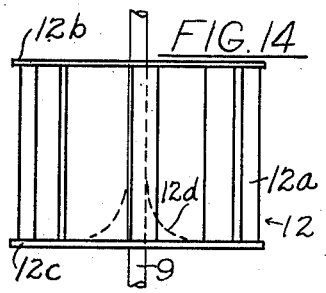
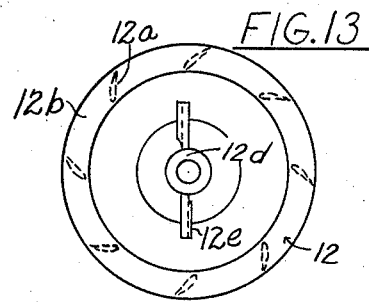
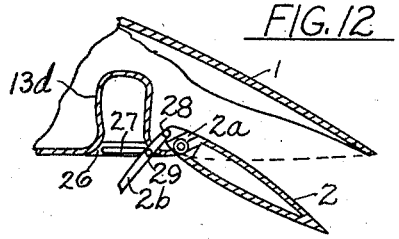
INVENTOR
Edward A. Stalker

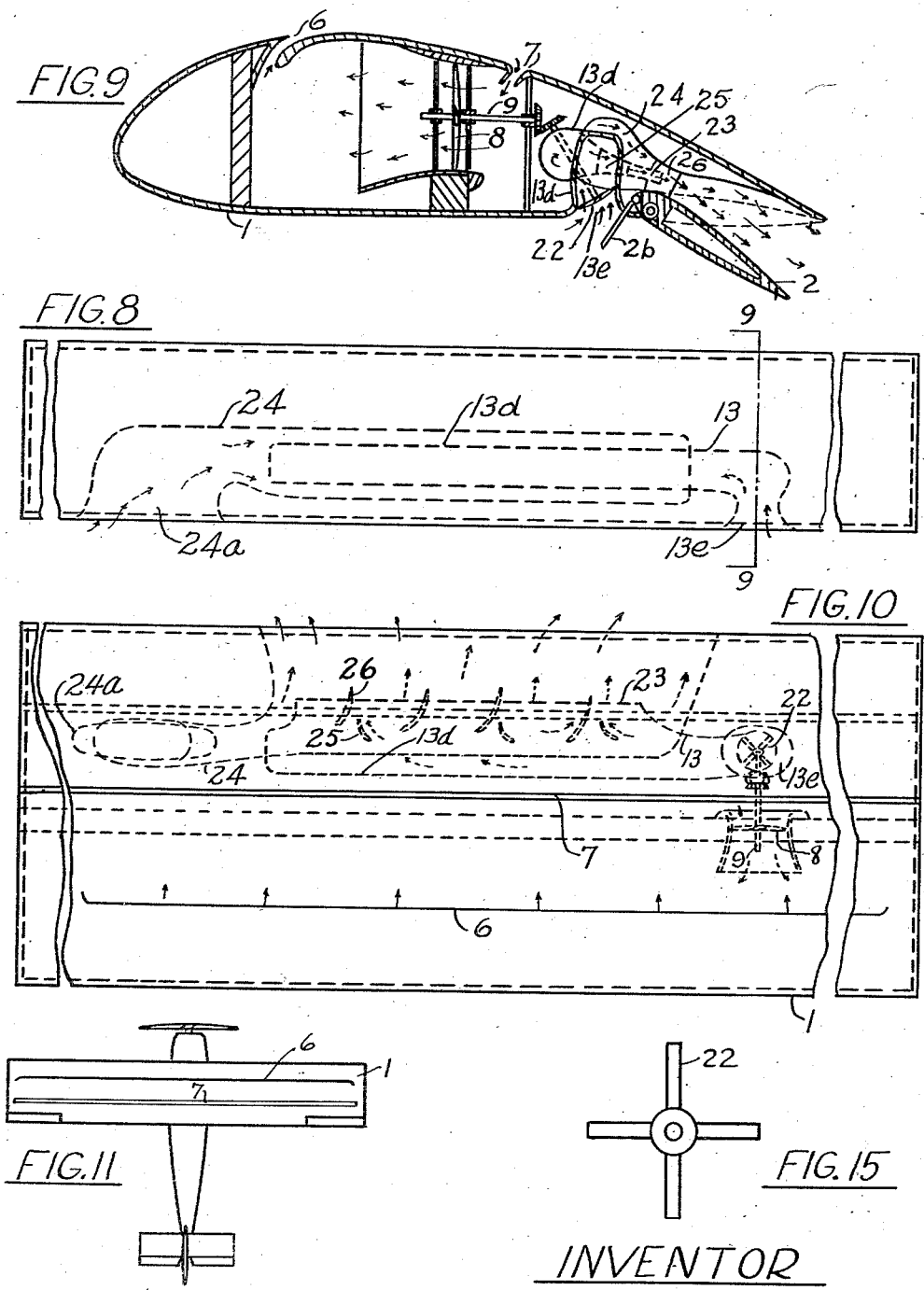

Patented Dec. 3, 1940

2,223,744

UNITED STATES PATENT OFFICE 2,223,744

WING AND SIMILAR CONSTRUCTION

Edward A. Stalker, Ann Arbor, Mich.

Application January 24, 1938, Serial No. 186,492
Renewed April 25, 1940

15 Claims. (Cl. 244—40)

My invention relates to means of increasing the transverse force on wings, vanes and like bodies, by energizing the boundary layer on the body surface.

In my U. S. Patent No. 1,691,942 I have shown means utilizing the energy of the flow relative to the wing to energize the boundary layer on the upper surface of the wing. The nature of the boundary layer is also discussed therein. Briefly, the boundary layer consists of the layer of fluid next to the surface which has a lowered velocity due to its energy loss from rubbing on the body surface. It is the loss of energy and the resultant layer formation which sets an upper limit to the lift of a wing under given conditions of velocity and fluid density. This is the same as saying that there is an upper limit to the lift coefficient $C_L$ as the angle of attack of the wing is increased.

The lift coefficient can be made to increase above its normal maximum by adding energy to the boundary layer as by blowing backward close to the wing surface so as to speed up the layer. Also, if the boundary layer is sucked into the wing a fresh layer of air is brought next to the wing so that the contiguous layer then has the requisite energy. In either case of blowing or sucking energy is added to the layer and so either procedure can be referred to as boundary layer energization.

In the patent referred to above a duct extends through the wing and conducts a flow of fluid from the under surface to the upper surface and a turbine is located in this passage to function as a prime mover. It drives a blower which inducts air at one slot in the upper surface and discharges it through another slot. Both the induction and the emission of fluid serve to energize the boundary layer.

One of the objects of this invention is to provide an exit construction for the duct so that more energy can be recovered from the air by the turbine with a very small disturbance of the lifting capacity of the wing. Another object is to provide a more efficient draft tube or expansion segment for the turbine duct. Another object is to locate the inlet of the duct in a position where it will have the minimum adverse effect on the lift and drag of the wing. Still another object is to provide a means of increasing the pressure difference between the lower and upper surfaces and to utilize this difference by the proper location of duct inlet and exit.

I attain these objects by the arrangements illustrated in the accompanying drawings in which—

Figure 1 is a plan view of the wing;
Figure 2 is a front elevation of the wing;
Figure 3 is a vertical or chordwise section of the wing along the line 3—3 in Figure 1;
Figure 4 illustrates the pressure distribution along the chord of a wing;
Figure 5 is a fragmentary chordwise section taken along line 5—5 in Figure 1;
Figure 6 is a plan view of the wing incorporating a rearward inlet duct;
Figure 7 is a vertical section taken along line 7—7 in Figure 6;
Figure 8 is the vertical view of the wing of the preferred form of the invention;
Figure 9 is a vertical section taken along line 9—9 in Figure 8;
Figure 10 is a plan view of the wing of the preferred form of the invention;
Figure 11 is a plan of the preferred wing on an airplane;
Figure 12 is a fragmentary view on an enlarged scale of the devices to close the inlets of the ducts as shown in Figure 9;
Figure 13 is an axial view of a turbine wheel;
Figure 14 is an elevation of the turbine wheel; and
Figure 15 is an axial view of a propeller type turbine wheel.

Referring to Figures 1 to 3 particularly, the wing is 1 and the split trailing edge flap is 2. It is actuated by the lever 3, rod 4, and bell crank 5, according to well known practice.

The wing has a front slot 6 for the discharge of fluid rearward to energize the boundary layer by blowing, and a suction slot 7 for the induction of the boundary layer into the wing.

A blower 8 sucks the layer in through slot 7 and blows it out slot 6. The blower is rotated by a shaft 9 and is located in an opening in the beam 10. There is also a rear beam 11 to support the wing.

The shaft 9 is turned by the turbine 12 located in the duct 13. The air leaves the turbine radially and flows into the expansion segments 14 and 15. These segments are of gradually increasing cross section and they extend spanwise along the front portion of the wing.

The air is sucked from the expansion tube through slots in the upper surface of the wing. These slots are 16 and have a small spanwise extent so that the low energy air from the turbine is at all localities a small portion of the flow passing a given portion of the wing span, such as the portion 17 indicated in Figure 1. The sum of the areas of the individual slots should preferably be somewhat greater than the area of the inlet 13a of the duct 13—14—15. I consider the duct as one unit running from the inlet 13a to the exits 16, that is, including the segments 14 and 15. It is also preferable to form the slots 16 directed rearward as indicated in Figure 5.

It is desirable that the exits 16 have a total area 50% larger than the area of the inlet 13a.

The exits are located near the leading edge of the wing so that they are in the region of greatest suction or lowest pressure —p. Figure 4 illustrates the chordwise pressure distribution for a wing with a flap and to obtain the best results the slots 16 should be under the peak of suction as indicated by the point 17 on the suction curve of Figure 4. The flap is indicated diagrammatically by the line 2'.

If no flap 2 is present the pressure distribution on the under surface is that indicated by the dotted line 18. With the flap present and deflected as indicated in Figures 2 and 4, the pressure distribution is as indicated by curve 19 in Figure 4. There are two peaks to the curve one near the leading edge and another near the hinge of the flap. Also the pressure is maintained at high values for the full length of the chord. Thus the provision of the flap makes it possible to locate the inlet of duct 13 at almost any point along the chord. There are some advantages in locating the inlet rearward on the wing and these will be discussed below. A feature of this invention is, then, that by providing a flap the performance of the turbine is not unduly sensitive to the location of the turbine duct inlet.

The presence of the high pressure below the wing forces more air to go around the nose of the wing and over the upper surface of the wing resulting in the high suction as indicated in Figure 4.

The ordinates of Figure 4 are units of dynamic or impact pressure. The relative wind when being brought to a stop gives rise to one unit $q$ of impact pressure. From Figure 4 it will be observed that the peak suction is about $-7q$ while the under side provides almost $1q$. Thus the total pressure difference for operating the turbine is about $8q$. This value will of course be reduced some by the discharge of the air from the turbine but the influence will be small if the proportions stated are observed.

Figures 6 and 7 show the inlet at the region of high pressure just forward of the flap hinge. I indicate this variation of the duct as 13b and the inlet as 13c. The rearward position of the inlet permits the use of a long draft tube 20 which discharges into the compartment 21 extending along the forward portion of the wing. The air flows from the compartment through slots 16 which have been described in connection with the other figures.

The turbine 22 shown in Figure 7 is of the propeller type but the cylindrical type of Figure 3 could be adapted, but less conveniently in this case than in Figure 3. Either type can be made very efficient.

I prefer a rearward inlet location since it puts the mutilated part of the wing further from the nose and will disturb the streamline flow over the nose less than the case of the inlet near the nose. The differences, however, are not great.

An air turbine requires a draft tube or tube having both a contraction and an expansion segment in order to realize the highest efficiency. This is similar to the case of water turbines. Both are of course fluid turbines and so should require similar constructions. The draft tube should have an expansion segment of small included angle between the walls. If possible this angle should be 7 degrees or less. A draft tube is formed like a Venturi tube.

The flap 2 has a segment or cover plate 2a projecting ahead of the hinge 23 so that when the flap 2 is retracted the plate 2a is put in the position of 2a shown dotted. The under surface of the wing is then made smooth for low resistance to the wind.

Another form of the invention is shown in Figures 8, 9, 10, and 11.

The turbine 22 is located in the duct 13d having the inlet 13e. As indicated in the figures the duct 13 makes a right angle bend just above the turbine 22 and extends spanwise. The discharge from the duct is through a spanwise exit 23. Above the turbine the area of successive cross sections of the duct are progressively larger so that the segment 13d acts as a draft tube for the turbine.

The exit 23 of the duct is surrounded by the throat of a Venturi tube 24 having its inlet at 24a. The exit of the venturi is formed by the flap 2 and the portion of the wing above. The inlet 24a is at the opposite end of the system from the inlet 13e.

By locating the exit 23 of the turbine draft tube in the throat of the venturi there is a great velocity of flow through the turbine duct 13d and a small turbine 22 may be used. Also the inlet 13e may be smaller.

There is a low pressure or suction at the constricted portion or throat of the tube 24 and since the exit of the turbine duct 13d is in this suction region there will be a high velocity through 13d, far higher than if the duct exit 23 were in only the low pressure existing just above the flap 2.

Suitable guide vanes 25 direct the flow out the exit 23 and provide a proper distribution of flow. Vanes 26 serve the same purpose for the Venturi tube 24.

Figure 12 illustrates a method of closing the inlets 13e and 24a. A section of the lower wall of the wing forms a cover 2b hinged to the plate 2a at 28. A pin 29 at each end of the cover slides in a slot 27 in the guide 26. When the flap 2 is depressed the cover 2b is placed in the position shown in Figure 12. The projection of 2b below the lower surface of the wing increases the impact pressure at the inlets and so serves to augment the flow through the turbine.

Figures 13 and 14 illustrate the turbine 12. It is comprised of the blades 17a arranged around the periphery and supported by the end plates 12b and 12c. The plate 12b is annular to admit the flow while 12c is a disk. The flow is guided axially and radially by the hub comprised of a central cylindrical part 12d and guide vanes 12e.

Figure 15 illustrates a propeller type turbine wheel similar to 22 of Figures 6 and 9.

Of the three types illustrated I prefer that of Figures 8 to 12. The flow over the nose of the wing will be less disturbed than in the other types and so greater lifts due to boundary layer energization should be realized.

A number of the turbine units may be located along the span.

While I have referred to the boundary layer energization on the wing it is to be understood that suitable ducts may be extended to any surface of the aircraft to energize the boundary layer thereon.

There are two types of wing flaps in common use, the split trailing edge flap and the trailing edge flap. Nose flaps have been used also. I use the term wing flap to designate flaps generally used to alter the wing.

A wing is to be understood as the lifting surface on either side of the aircraft.

While I have illustrated certain specific forms of the invention it is to be understood that I do not limit myself to these exact forms but intend to claim my invention broadly as set forth in the appended claims.

I claim:

1. In combination, a wing associated with a relative flow of fluid, and a prime mover deriving its energy from the fluid flow, said prime mover comprising a duct in the wing and a turbine wheel mounted in the duct which has a plurality of exits in the upper wall of the wing to discharge the flow over the upper surface of the wing to provide for a high energy output of the turbine with a small effect on the lifting capacity of the wing.

2. In combination, a wing having a slot in its upper wall for use in energizing the boundary layer, a duct in the wing in communication with the region above the wing through a plurality of exits spaced apart spanwise in the upper wall of the wing, a prime mover in the duct deriving its energy from the duct flow, a blower operably connected to the prime mover and inducing a fluid flow through said slot to energize the boundary layer on the upper surface of the wing, said plurality of exits serving to provide a high turbine power with a small disturbance of the flow over the wing.

3. In combination, a wing having an energization slot in its wall, a split trailing edge flap to augment the pressure on the lower surface, a duct in the wing in communication with the region above the wing through a plurality of exits spaced apart spanwise in the upper wall of the wing, said duct having its inlet in the lower wall of the wing at a distance back from the leading edge substantially greater than the rearward location of said exits, a prime mover in the duct deriving its energy from the duct flow, a blower operably connected to the prime mover and inducing a fluid flow through said energizing slot to energize the boundary layer on the surface of the wing.

4. In combination, a wing associated with a relative flow of fluid and having a trailing edge flap to augment the pressure near its nose, a duct within the wing having an inlet in the lower surface in the vicinity of the flap forward edge for the ingress of fluid, and a prime mover in the duct and actuated by the flow therein, said duct communicating with the region above the wing nose to provide a large fluid pressure difference between its inlet and exit.

5. In combination, a wing associated with a relative flow of fluid, a wing flap movable to form with the wing a conduit having a rearward facing exit, means forming for the conduit an inlet subject to the impact pressure of the relative flow, said conduit having a constricted cross section to form a throat, a duct having an inlet spaced substantially apart from the first said inlet and an exit into the said throat whereby there is a high velocity flow through said duct, and a prime mover in said duct to derive energy from the flow therein.

6. In combination, a wing associated with a relative flow of fluid and having an opening in its surface for boundary layer energization, a wing flap movable to form with the wing a conduit having a rearward facing exit, said conduit having an inlet in the lower surface of the wing, said conduit having a constricted cross section to form a throat, a duct having an inlet spaced spanwise substantially apart from the first said inlet and an exit into the said throat whereby there is a high velocity flow through said duct, a prime mover in said duct to derive energy from the flow therein, and a blower operably connected to said prime mover to induce a flow through said slot to energize the boundary layer on the wing.

7. In combination, an aircraft body and a wing associated with a relative flow of fluid, a flap movable to form with the wing a conduit having a rearward facing exit, means forming for the conduit an inlet subject to the impact pressure of the relative flow, said conduit having a constricted cross section to form a throat portion, a duct having an inlet spaced substantially apart from the first said inlet and an exit into the said throat whereby there is a high velocity flow through said duct, a prime mover in said duct to derive energy from a flow therein, said wing having a slot in the upper surface, and a pumping means driven by the prime mover to induce a flow through said slot to energize the boundary layer on the aircraft.

8. In combination a wing associated with a relative flow of fluid, a wing flap movable to form with the wing a conduit having a throat and a rearward facing exit, means forming for the conduit an inlet subject to the impact pressure of the relative flow, a duct having an inlet spaced substantially apart from the first said inlet and an exit into the said throat whereby there is a large flow through said duct.

9. In combination, a wing associated with a relative flow of fluid and having a slot in its upper surface, a wing flap movable to form with the wing a conduit having a throat and a rearward facing exit, means forming for the conduit an inlet subject to the impact pressure of the relative flow, a duct having an inlet spaced substantially apart from the first said inlet and an exit into the said throat whereby there is a large flow through said duct, and power means in said duct to cause a flow through the wing slot to energize the boundary layer on the wing.

10. In combination a wing having a hollow compartment and a plurality of spanwise spaced slots in the upper surface in communication therewith, a flap displaceable to form a concavity at the under surface, means to transfer air through the compartment of the wing to the exit slots from the region of said concavity, said exits being confined to a narrow spanwise band to preclude loss of lift from a chordwise flow inside the wing.

11. In combination, a wing having a trailing edge flap, a passage through the wing from the under surface to the upper surface, said passage having its inlet ahead of the flap leading edge said passage having a plurality of exits in the upper surface in both left and right spanwise halves of the wing, the spanwise extent of said exit slots being a minor fraction of the half span.

12. In combination a wing associated with a relative flow of fluid, an element movable to form with the wing a conduit having a rearward facing exit, a duct carrying a flow and having its exit into the said conduit, said conduit and duct cooperating to augment the flow through the duct, and a prime mover disposed in said duct and extracting energy from the flow therein.

13. In combination a wing having a passage and a slot in the upper surface in communication therewith, an element displaceable to augment the pressure on the under surface, said passage having an inlet in the high pressure region ahead of said element, and a prime mover in said passage to derive energy from the flow therein.

14. In combination a wing associated with a relative flow and having a passage carrying a flow therethrough to an exit in the upper surface, said passage extending spanwise outward toward the tip of the wing and downstream of the flow therein, and a prime mover in the passage actuated by its flow.

15. In combination a wing associated with a relative flow and having a passage carrying a flow therethrough to the region above the wing, and a prime mover in the passage to derive energy from its flow, said passage having an exit area distributed along a major portion of a semi-span of the wing so as to have a narrow chordwise extent conducive to preserving the lift of the wing against the action of the discharged air from the turbine.

EDWARD A. STALKER.